United States Patent
Kashiwagi et al.

(10) Patent No.: US 10,574,709 B2
(45) Date of Patent: Feb. 25, 2020

(54) CONTENT REPRODUCTION APPARATUS, CONTENT REPRODUCTION SYSTEM, AND CONTENT REPRODUCTION METHOD

(71) Applicant: YAMAHA CORPORATION, Hamamatsu-shi (JP)

(72) Inventors: Akihito Kashiwagi, Ipoh (MY); Masafumi Kanada, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 38 days.

(21) Appl. No.: 15/845,260

(22) Filed: Dec. 18, 2017

(65) Prior Publication Data

US 2018/0124127 A1 May 3, 2018

Related U.S. Application Data

(63) Continuation of application No. PCT/JP2016/067949, filed on Jun. 16, 2016.

(30) Foreign Application Priority Data

Jun. 23, 2015 (JP) ................................ 2015-125260

(51) Int. Cl.
*G10K 15/02* (2006.01)
*G10K 15/04* (2006.01)
(Continued)

(52) U.S. Cl.
CPC .......... *H04L 65/1083* (2013.01); *G06F 13/00* (2013.01); *G06F 16/4387* (2019.01);
(Continued)

(58) Field of Classification Search
None
See application file for complete search history.

(56) References Cited

U.S. PATENT DOCUMENTS

2009/0156251 A1* 6/2009 Cannistraro ........... G08C 17/02
455/557
2010/0094935 A1* 4/2010 Svendsen .......... H04L 29/08729
709/204
(Continued)

FOREIGN PATENT DOCUMENTS

WO 2012117452 A1 9/2012

OTHER PUBLICATIONS

International Search Report issued in Intl. Appln. No. PCT/JP2016/067949 dated Sep. 6, 2016. English translation provided.
(Continued)

*Primary Examiner* — Philip J Chea
*Assistant Examiner* — Hassan A Khan
(74) *Attorney, Agent, or Firm* — Rossi, Kimms & McDowell LLP

(57) ABSTRACT

A content reproduction apparatus includes: a receiver that receives first information indicating a first content from a first user terminal capable of providing the first content, and receives second information indicating a second content from a second user terminal capable of providing the second content; a processing circuit including a control unit that creates a shared list including the first and second contents, based on the first and second information; and a transmitter that transmits the shared list to the first user terminal. The receiver receives first evaluation information from the first user terminal, the first evaluation information indicating a first evaluation for at least one content included in the shared list. The control unit decides a reproduction order of contents included in the shared list, based on the received first evaluation information.

19 Claims, 12 Drawing Sheets

(51) Int. Cl.
*H04L 29/06* (2006.01)
*G06F 16/438* (2019.01)
*G06F 13/00* (2006.01)
*H04M 1/00* (2006.01)
*H04M 1/725* (2006.01)

(52) U.S. Cl.
CPC ............ *H04L 65/604* (2013.01); *H04M 1/00* (2013.01); *H04M 1/7253* (2013.01); *H04M 1/72558* (2013.01); *H04M 2250/02* (2013.01)

(56) References Cited

U.S. PATENT DOCUMENTS

| | | | | |
|---|---|---|---|---|
| 2013/0080445 A1* | 3/2013 | Gogan | ................ | G06F 16/4387 707/748 |
| 2013/0290419 A1* | 10/2013 | Spencer | ................ | H04L 67/104 709/204 |
| 2015/0288779 A1* | 10/2015 | Okumura | ................ | H04L 67/10 709/219 |
| 2015/0347577 A1* | 12/2015 | Miyazaki | ............ | H04N 21/436 707/752 |
| 2017/0278537 A1* | 9/2017 | Sekiguchi | ............... | G06F 13/00 |

OTHER PUBLICATIONS

Written Opinion issued in Intl. Appln. No. PCT/JP2016/067949 dated Sep. 6, 2016.

* cited by examiner

FIG. 5A
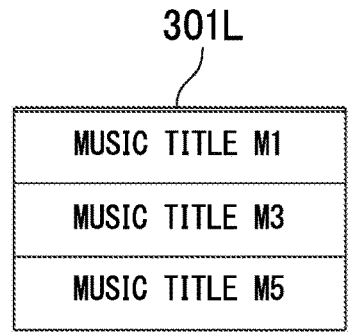
FIG. 5B
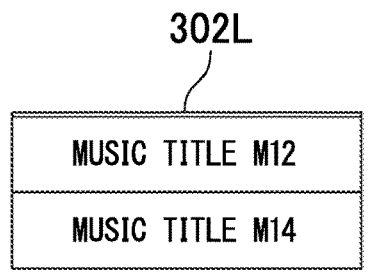
FIG. 5C
| TERMINAL NAME | MUSIC TITLE |
|---|---|
| SMARTPHONE 301 | MUSIC TITLE M1 |
| SMARTPHONE 301 | MUSIC TITLE M3 |
| SMARTPHONE 301 | MUSIC TITLE M5 |
| SMARTPHONE 302 | MUSIC TITLE M12 |
| SMARTPHONE 302 | MUSIC TITLE M14 |

FIG. 10

| TERMINAL NAME | MUSIC TITLE | LOVE IT | HATE IT | TOTAL SCORE |
|---|---|---|---|---|
| SMARTPHONE 301 | MUSIC TITLE M1 | 2 | −2 | 0 |
| SMARTPHONE 301 | MUSIC TITLE M3 | 0 | −1 | −1 |
| SMARTPHONE 301 | MUSIC TITLE M5 | 2 | 0 | 2 |
| SMARTPHONE 302 | MUSIC TITLE M12 | 5 | −2 | 3 |
| SMARTPHONE 302 | MUSIC TITLE M14 | 1 | 0 | 1 |

S

CONTENT REPRODUCTION APPARATUS, CONTENT REPRODUCTION SYSTEM, AND CONTENT REPRODUCTION METHOD

CROSS-REFERENCE TO RELATED APPLICATIONS

The present application is a continuation application of International Application No. PCT/JP2016/067949, filed Jun. 16, 2016, which claims priority to Japanese Patent Application No. 2015-125260, filed Jun. 23, 2015. The contents of these applications are incorporated herein by reference.

BACKGROUND OF THE INVENTION

The present invention relates to a content reproduction apparatus that is connected to a plurality of user terminals and that decides a content reproduction order, a content reproduction system, and a content reproduction method.

DESCRIPTION OF RELATED ART

For example, PCT International Publication No. WO 2012/117452 (hereinafter Patent Document 1) discloses a content reproduction system including three source devices (user terminals) that store music data as content, and a sync device (content reproduction apparatus) that reproduces music data acquired from each source device.

More specifically, in the content reproduction system disclosed in Patent Document 1, the user terminal transmits to the content reproduction apparatus, a reproduction request of the content possessed by the user terminal. Upon receiving the reproduction request from each user terminal, the content reproduction apparatus reproduces each content indicated by each reproduction request.

However, Patent Document 1 discloses only the case where the order of reproducing a plurality of contents is the order of receiving reproduction requests.

SUMMARY OF THE INVENTION

An exemplary object of the present invention is to provide a content reproduction apparatus that is capable of deciding a reproduction order of several contents that can be provided by the respective user terminals while entertaining the user even more, and a content reproduction system, and content reproduction method.

A content reproduction apparatus according to an aspect of the present invention includes: a receiver that receives first information from a first user terminal that is capable of providing a first content, the first information including information that indicates the first content, the receiver receiving second information from a second user terminal that is different from the first user terminal and that is capable of providing a second content, the second information including information that indicates the second content; a processing unit including a control unit that creates a shared list including the first and second contents, based on the first and second information; and a transmitter that transmits the shared list to the first user terminal. The receiver receives first evaluation information from the first user terminal, the first evaluation information indicating a first evaluation for at least one content included in the shared list. The control unit decides a reproduction order of contents included in the shared list, based on the received first evaluation information.

The shared list includes information (for example, content names) indicating contents that can be provided by the first and second user terminals. It is possible to evaluate contents of the second user terminal that are included in the shared list, via the first user terminal.

In the content reproduction apparatus above, the user of the first user terminal can evaluate not only a content that can be provided by the first user terminal but also a content that can be provided by the second user terminal, and a content is selected based on this evaluation. Therefore, the above-described content reproduction apparatus can decide a reproduction order of contents that can be provided by the first and second user terminals while providing the user of the first user terminal with an unprecedented way of amusement in which contents of other users are evaluated.

A content reproduction system according to an aspect of the present invention includes: a receiver that receives first information from a first user terminal that is capable of providing a first content, the first information including information that indicates the first content, the receiver receiving second information from a second user terminal that is different from the first user terminal and that is capable of providing a second content, the second information including information that indicates the second content; a first processing circuit including a first control unit that creates a shared list including the first and second contents, based on the first and second information; a transmitter that transmits the shared list to the first user terminal; a second processing circuit including a second control unit that decides a reproduction order of contents included in the shared list; and a third processing circuit including a third control unit that reproduces contents included in the shared list according to the reproduction order. The receiving unit receives first evaluation information from the first user terminal, the first evaluation information indicating a first evaluation for at least one content included in the shared list. The second control unit decides the reproduction order, based on the received first evaluation information.

A content reproduction method according to an aspect of the present invention includes: receiving first information from a first user terminal that is capable of providing a first content, the first information comprising information that indicates the first content; receiving second information from a second user terminal that is different from the first user terminal and that is capable of providing a second content, the second information comprising information that indicates the second content; creating a shared list comprising the first and second contents, based on the first and second information; transmitting the shared list to the first user terminal; receiving first evaluation information from the first user terminal, the first evaluation information indicating a first evaluation for at least one content comprised in the shared list; and deciding a reproduction order of contents comprised in the shared list, based on the received first evaluation information.

According to an embodiment of the present invention, it is possible to reproduce a plurality of contents possessed by each user terminal while providing each user with an unprecedented way of amusement.

BRIEF DESCRIPTION OF THE DRAWINGS

FIG. 5A is a diagram showing an example of a public list, in the embodiment of the present invention.

FIG. 5B is a diagram showing an example of a public list, in the embodiment of the present invention.

FIG. 5C is a diagram showing an example of a shared list, in the embodiment of the present invention.

FIG. 10 is a diagram showing an example of scores of the respective contents on the shared list after the operation of the first modified example, in the embodiment of the present invention.

EMBODIMENTS FOR CARRYING OUT THE INVENTION

Figure 1:
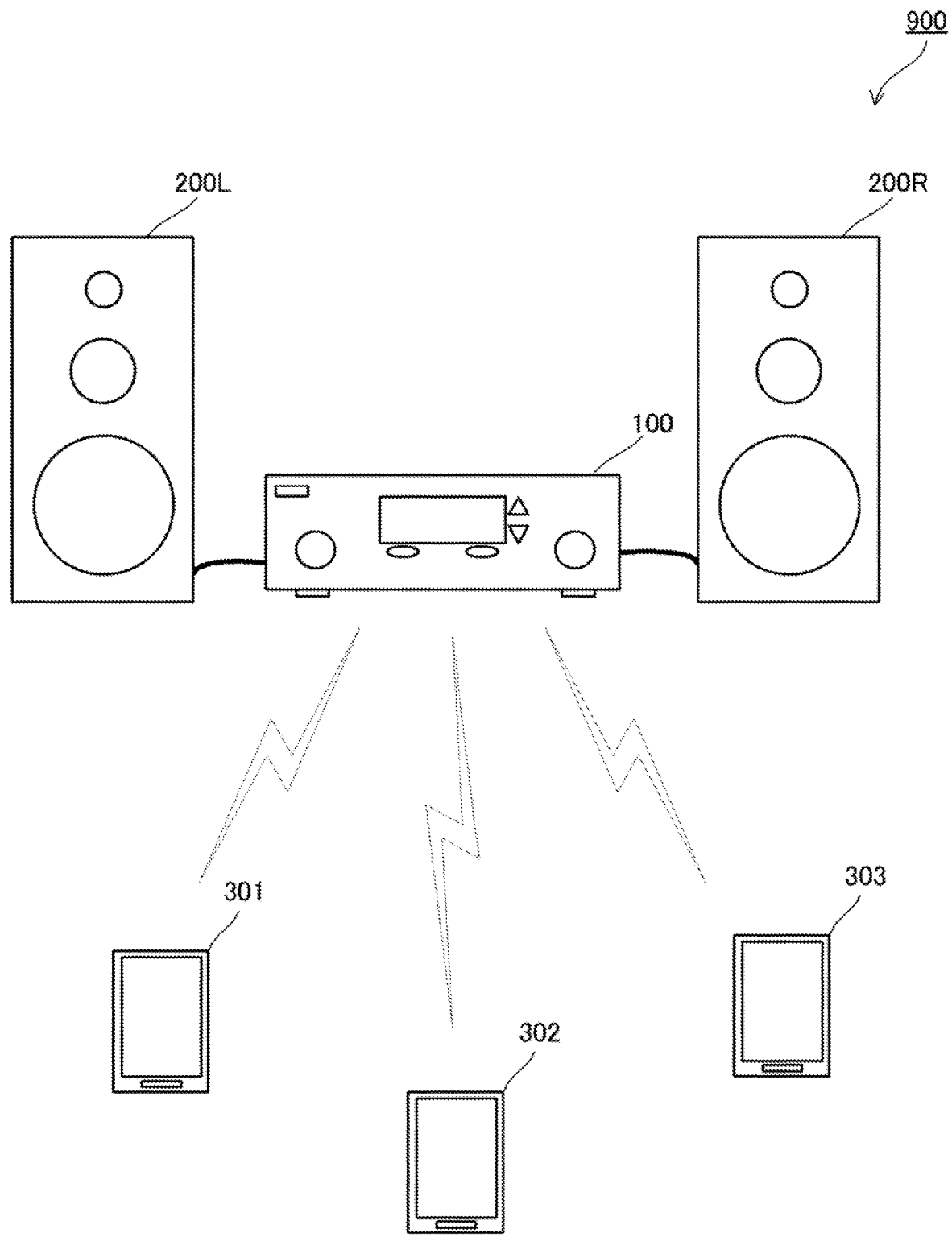
FIG. 1 is a diagram for describing a brief overview of a content reproduction system according to an embodiment of the present invention.
Figure 2A:
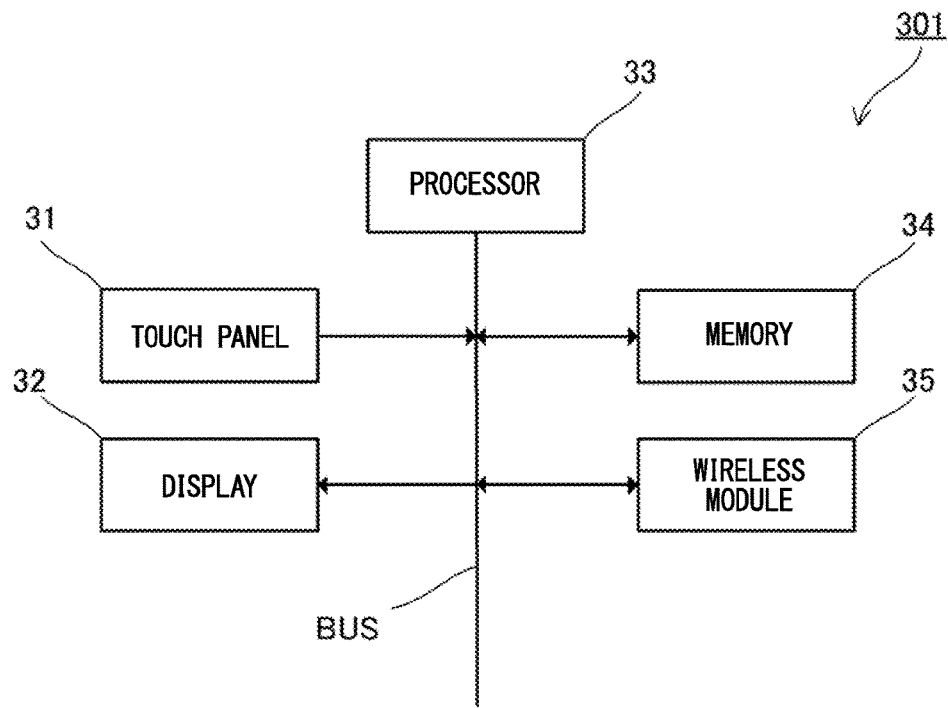
FIG. 2A is a hardware block diagram showing a part of a configuration of a smartphone according to the embodiment of the present invention.
Figure 2B:
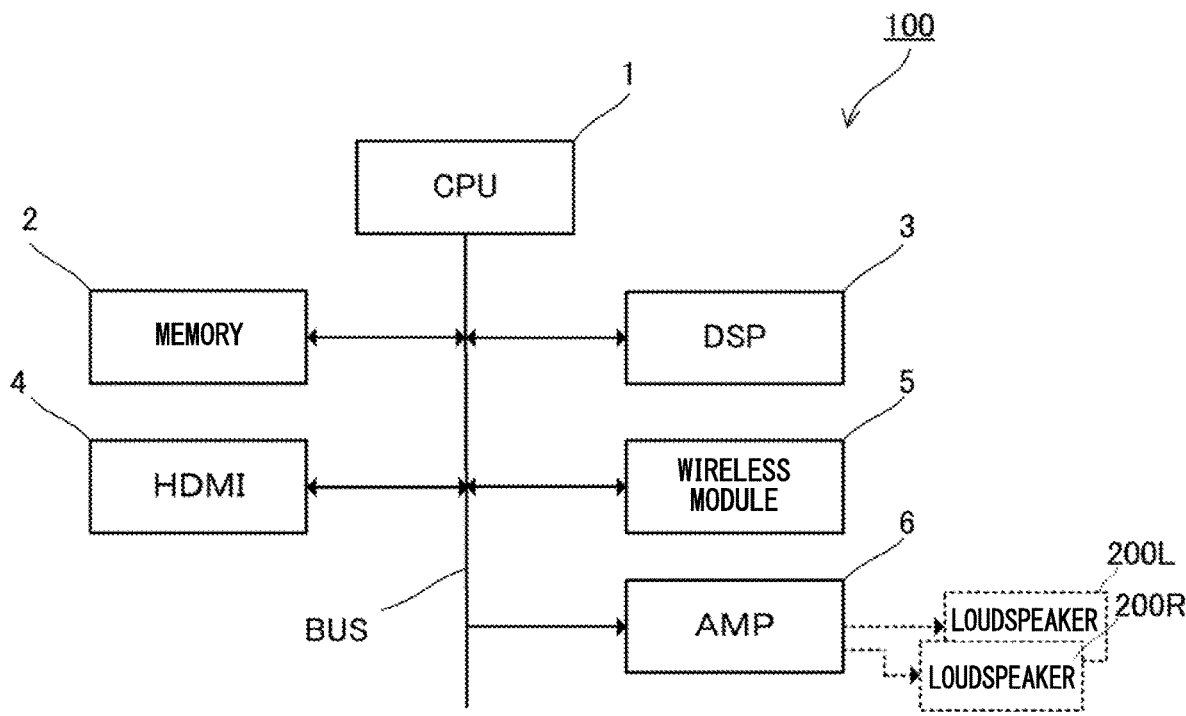
FIG. 2B is a hardware block diagram showing a part of a configuration of an AV receiver according to the embodiment of the present invention.

A content reproduction system 900 according to a first embodiment is described with reference to FIG. 1, FIG. 2A, and FIG. 2B. FIG. 1 is a diagram for describing a brief overview of the content reproduction system 900. FIG. 2A is a hardware block diagram showing a part of a configuration of a smartphone 301. FIG. 2B is a hardware block diagram showing a part of a configuration of an AV (audio visual) receiver 100.

As shown in FIG. 1, the content reproduction system 900 includes an AV receiver 100, two loudspeakers, namely, loudspeaker 200L and loudspeaker 200R, and three smartphones, namely, smartphone 301, smartphone 302, and smartphone 303. The AV receiver 100, the smartphone 301, the smartphone 302, and the smartphone 303 are connected by means of the Bluetooth (registered trademark) standard for example. The AV receiver 100, the smartphone 301, the smartphone 302, and the smartphone 303 may be connected by means of another standard (such as Wi-Fi (registered trademark)). Connection between the AV receiver 100, the smartphone 301, the smartphone 302, and the smartphone 303 need not be limited to wireless communication, and may be established in a wired connection manner using wired LAN or the like.

The AV receiver 100 corresponds to a content reproduction apparatus. Any one of the smartphones 301 to 303 may correspond to the content reproduction device. In this case, loudspeakers may be connected to the smartphones 301 to 303. The smartphone 301, the smartphone 302, and the smartphone 303 correspond to user terminals. The content reproduction apparatus may also be an audio player, a headphone-type player, or the like. The user terminal may be a tablet-type terminal, a personal computer, a music terminal, a wearable terminal, or the like, which do not have telephone functions. Hereunder, the smartphone 301, the smartphone 302, and the smartphone 303 may be abbreviated as smartphones 301 to 303 in some cases.

In the content reproduction system 900, each of the smartphones 301 to 303 is capable of providing (or possessing) contents. The content reproduction system 900 causes each user to evaluate the content of another user and causes the user to select the content to be reproduced by an evaluation operation. Therefore, the content reproduction system 900 according to the present embodiment is capable of providing each user of the smartphones 301 to 303 with a way of enjoying evaluating a content of another user and a way of enjoying selecting a content together with the other user.

Hereunder, in the present embodiment, a case where the content is music data is described. However, the content may also be video data.

Next, a configuration of the content reproduction system 900 is described. As shown in FIG. 2A, the smartphone 301 includes a touch panel 31, a display 32, a processor 33, a memory 34, and a wireless module 35. Each of the configurations is connected to a common BUS.

The processor 33 of the smartphone 301 performs overall control of other respective configurations. The wireless module 35 performs information transmission and reception by means of the Bluetooth (registered trademark) standard. The touch panel 31 accepts an operation input from a user. The smartphone 301 realizes a GUI (graphical user interface) by means of the touch panel 31 and the display 32. The memory 34 stores music data as contents. The music data that can be provided by the smartphone 301 is not limited to being stored in the memory 34, and may be stored in an information processing apparatus such as a server on the Internet.

Also, the memory 34 stores a program. The program stored in the memory 34 is executed by the processor 33. By executing this program, the smartphone 301 realizes acceptance of an evaluation operation for music data that another smartphone can provide, and selection of music data together with other users.

The smartphone 302 and the smartphone 303 each have the same configuration as that of the smartphone 301. That is to say, the smartphone 302 and the smartphone 303 respectively realize a GUI in a manner similar to that of the smartphone 301. The smartphone 302 and the smartphone 303 store music data in a manner similar to that of the smartphone 301.

As shown in FIG. 2B, the AV receiver 100 includes a CPU (central processing unit) 1, a memory 2, a DSP (digital signal processor) 3, a HDMI (high definition multimedia interface (HDMI is a registered trademark)) 4, a wireless module 5, and an AMP (amplifier) 6. Each of the configurations is connected to a common BUS.

A receiving unit, a control unit, and a transmission unit of the content reproduction apparatus may each correspond to at least one of these configurations of the AV receiver 100. For example, the receiving unit and the transmission unit may each correspond to the CPU 1, and the wireless module 5. The control unit may correspond to the CPU 1, the DSP 3, and the AMP 6.

A receiving unit, a first control unit, a transmission unit, a second control unit, and a third control unit of the content reproduction system may each correspond to at least one of these configurations of the AV receiver 100. For example, the receiving unit and the transmission unit may each correspond to the CPU 1, and the wireless module 5. The first to third control units may each correspond to the CPU 1, the DSP 3, and the AMP 6.

The DSP 3 is a processor for various types of sound processes to be performed on sound data included in music data. The HDMI 4 is an interface for transmitting and/or receiving content data including music data. The wireless module 5 realizes communication by means of the Bluetooth (registered trademark) standard. The AMP 6 is a circuit that amplifies sound signals. Sound signals that have been amplified by the AMP 6 are output to the loudspeaker 200L and the loudspeaker 200R. Moreover, the memory 2 stores a program. The CPU 1 reads the program from the memory 2, and executes the read program. By executing this program, the AV receiver 100 decides the reproduction order of a plurality of pieces of music data that can be provided by the smartphones 301 to 303, based on the evaluation operation accepted by the smartphones 301 to 303.

The memory 2 stores public lists that are transmitted from the smartphones 301 to 303. Also the memory 2 stores voting information that is transmitted from the smartphones 301 to 303. The public list and the voting information will be described later.

Figure 3:
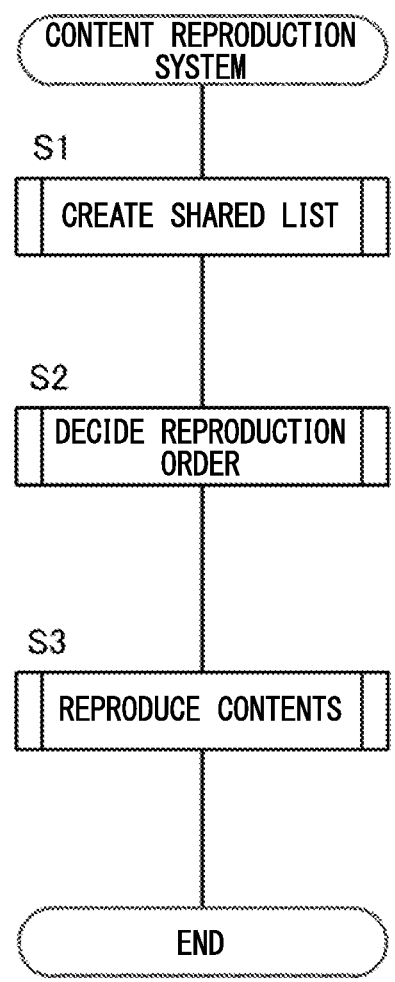
FIG. 3 is a flowchart showing operations of the content reproduction system shown in FIG. 1.

Next, operations of the content reproduction system 900 are described with reference to FIG. 3. FIG. 3 is a flowchart showing operations of the content reproduction system 900.

As shown in FIG. 3, the content reproduction system 900 first creates a shared list S (Step S1). The shared list S is a list obtained by merging public lists of music data (music) that can be provided by the smartphones 301 to 303. The public list is a list of music data that are available to the other smartphones, among the music data that can be provided by the respective smartphones 301 to 303. Publication of music data means that names and the like of music data are displayed by other smartphones. The public list corresponds to a holding list according to the embodiment of the present invention.

After creating the shared list S (Step S1), the content reproduction system 900 decides the reproduction order of the music data (Step S2), and reproduces the plurality of pieces of music data in the decided reproduction order (Step S3).

Figure 4:
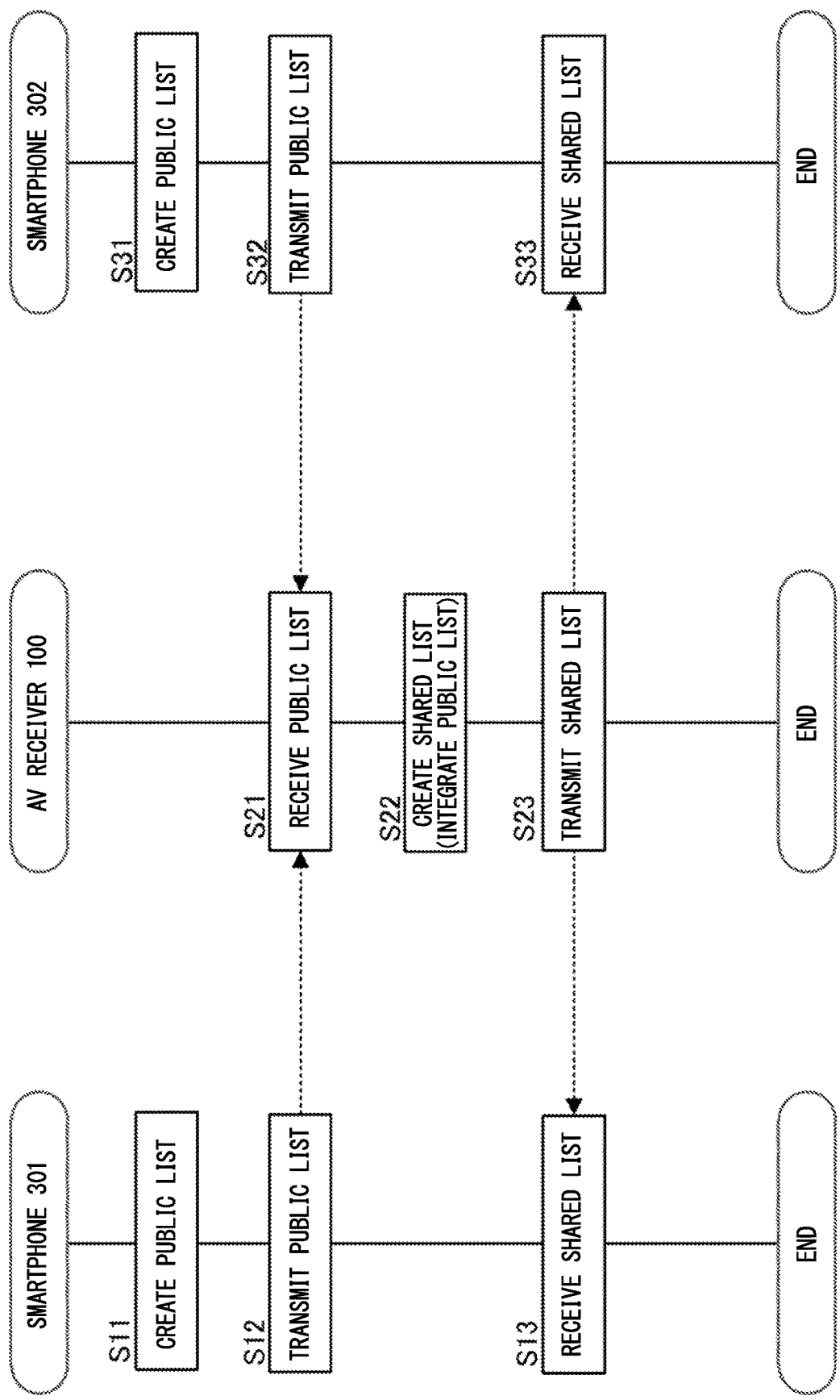
FIG. 4 is a flowchart showing each operation of an AV receiver and two smartphones in a shared list creation process, in the embodiment of the present invention.

The specific operations of Step S1 are described with reference to FIG. 4. FIG. 4 is a flowchart showing the respective operations of the AV receiver 100, the smartphone 301, and the smartphone 302 in the process of creating the shared list S. The dotted arrows in FIG. 4 denote directions of information transmission. Moreover, description of the operation of the smartphone 303 is omitted in the example shown in FIG. 4.

First, the smartphone 301 creates a public list (Step S11). For example, the smartphone 301 displays on the display 32, a list of music data that the own terminal (smartphone 301) can provide, and accepts via the touch panel 31, an operation of public sharing approval/disapproval for each piece of music data shown in the displayed list. The smartphone 301 creates a list including music data indicated by the accepted operation, as a public list. The smartphone 301 may create a list including all pieces of music data that the own terminal can provide, as a public list.

An example of the public lists is described with reference to FIG. 5A. As a specific example, there will be described a case where the smartphone 301 can provide music data, with the music data name being music title M1, music title M2, music title M3, music title M4, and music title M5.

Here, it is assumed that the user of the smartphone 301 performs an operation on the smartphone 301 to make public the music data of the titles of the music title drtf5, the music title M3, and the music title M5. Then, as shown in FIG. 5A, the smartphone 301 creates a public list 301L including the music title M1, the music title M3, and the music title M5 that are selected as being available for public.

Returning to the flowchart of FIG. 4, the smartphone 302 creates a public list (Step S31). In this example, the smartphone 302 creates the public list 302L shown in FIG. 5B. That is to say, in this example, the user of the smartphone 302 selects, from the music data of the music titles M11 to M15 that can be provided by the smartphone 302, the music data of the music title M12 and the music title M14 as being available for the smartphone 301 and the smartphone 303.

The smartphone 301 and the smartphone 302 control the wireless module 35 to thereby transmit the created public list 301L and public list 302L to the AV receiver 100 (Step S12 and Step S32). The AV receiver 100 receives the public list 301L and the public list 302L from the smartphone 301 and the smartphone 302 (Step S21).

The public list 301L and the public list 302L may be transmitted and received by means of wireless communication that conforms to the Bluetooth (registered trademark) standard or by means of wireless communication that conforms to the Wi-Fi (registered trademark) standard. The transmission and reception of the public list 301L and the public list 302L are not limited to wireless communication, and may be performed by means of wired communication (for example, USB cable).

Upon receiving the public list 301L and the public list 302L from the smartphone 301 and the smartphone 302 (Step S21), the AV receiver 100 creates a shared list S (Step S22). The shared list S is created by merging the public list 301L and the public list 302L received in Step S21. Then, as shown in FIG. 5C, the shared list S including the titles of the music title M1, the music title M3, the music title M5, the music title M12, and the music title M14 is created. In the shared list S shown in FIG. 5C, the title of each piece of music data is associated with the name of a smartphone that is capable of providing the music data. Music data that can be provided by a plurality of smartphones may be included in the shared list S in duplicate or may be combined and included in the shared list S.

In the present embodiment, there is no limitation that the smartphone 301 (302) transmits a public list and the AV receiver 100 creates the shared list S using the public list. For example, the smartphone 301 (302) may transmit to the AV receiver 100, information (content title) that indicates the music data (contents) that can be provided by the smartphone 301 (302). The AV receiver 100 may create the shared list S based on the information.

The AV receiver 100 transmits the created shared list S to the smartphones 301 to 303 (Step S23). The smartphones 301 to 303 receive the shared list S from the AV receiver 100 (Step S13 and Step S33).

Figure 6:
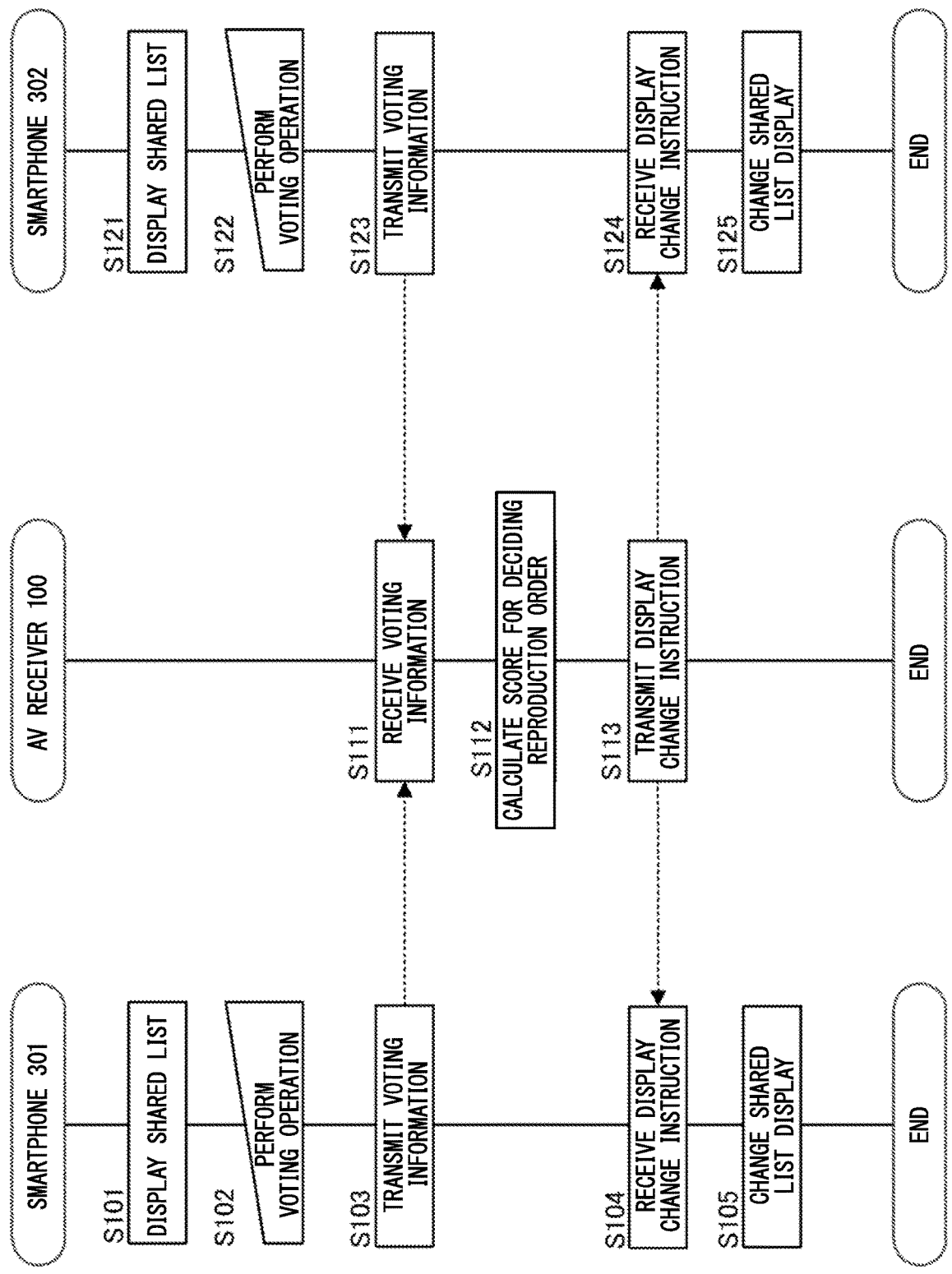
FIG. 6 is a flowchart showing each operation of an AV receiver and two smartphones in a process of deciding a reproduction order, in the embodiment of the present invention.

Next, a process of deciding the reproduction order shown in Step S2 of the flowchart of FIG. 3 will be specifically described with reference to FIG. 6. FIG. 6 is a flowchart showing the respective operations of the AV receiver 100, the smartphone 301, and the smartphone 302 in the process of deciding the reproduction order. Description of the operation of the smartphone 303 is omitted in the example shown in FIG. 6.

Hereinafter, the evaluation operation of the embodiment of the present invention will be described as a voting operation. The operation of this evaluation corresponds to selecting music data.

As shown in FIG. 6. the smartphone 301 and the smartphone 302 display the shared list S (Step S101 and Step S121). Then, the smartphone 301 and the smartphone 302 accept the voting operation with respect to each piece of music data on the shared list S (Step S102 and Step S122).

Figure 7:
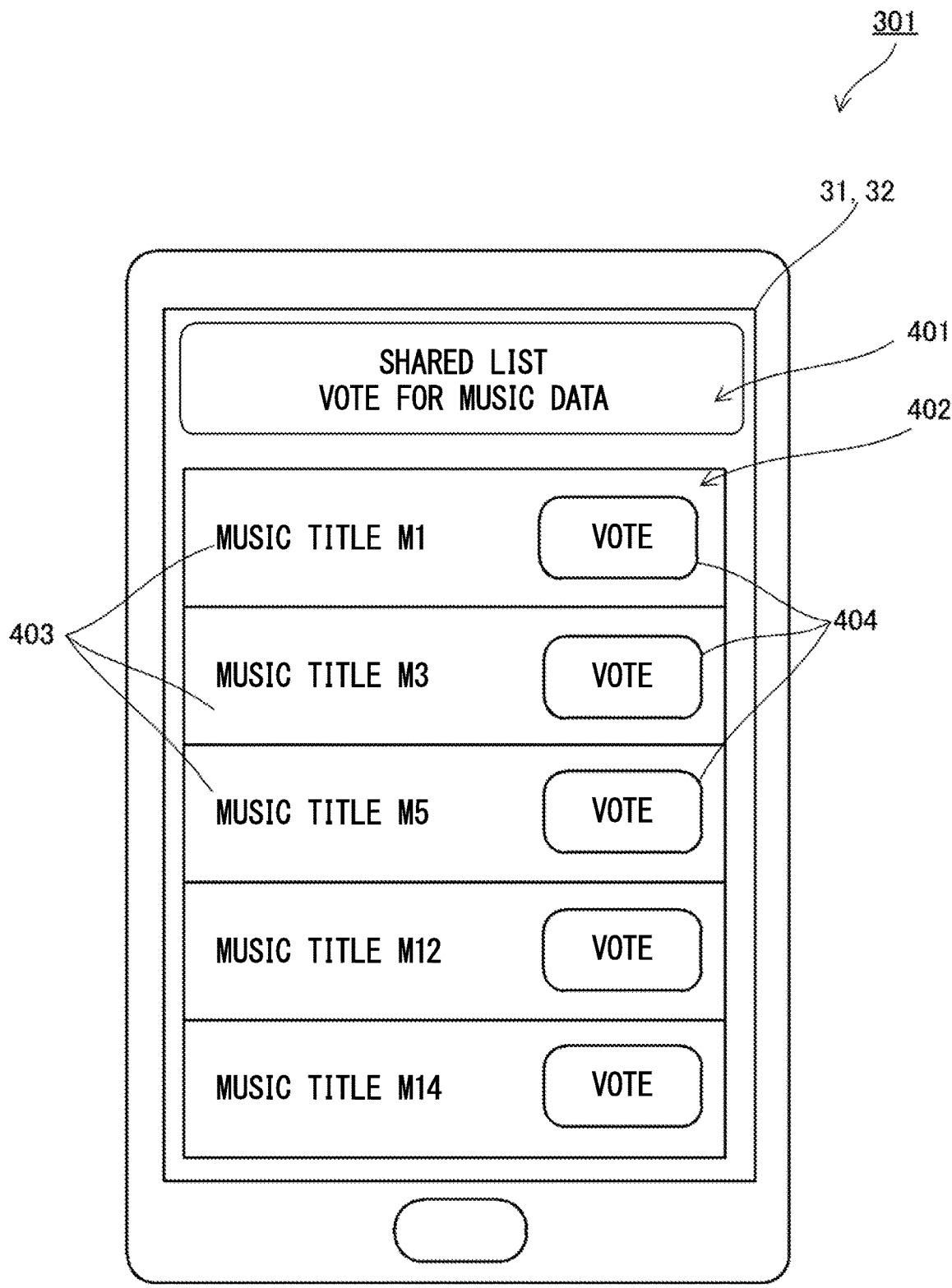
FIG. 7 is a diagram showing a display example of a smartphone for accepting a voting operation, in the embodiment of the present invention.

Acceptance of the voting operation is described with reference to FIG. 7. FIG. 7 is a diagram showing a display example of the smartphone accepting the voting operation.

As shown in FIG. 7, the smartphone 301 displays in a display region 401 of the display 32, an instruction to vote for each piece of music data (music piece) on the shared list S. Specifically, the smartphone 301 displays in the display region 402 of the display 32, titles 403 of the respective pieces of music data on the shared list S, and voting buttons 404 corresponding to the respective pieces of music data.

The user of the smartphone 301 votes for one of the plurality of pieces of music data on the shared list S by touching the display region of one of the voting buttons 404. Then, as shown in the flowchart of FIG. 6, the smartphone 301 transmits the voting information indicating the voted piece of music data, to the AV receiver 100 (Step S103). The voting information corresponds to the evaluation information of the embodiment of the present invention.

As with the case of the smartphone 301, the smartphone 302 transmits the voting information indicating the music data voted by the user, to the AV receiver 100 (Step S123).

Upon receiving voting information (Step S111), the AV receiver 100 calculates a score for deciding the reproduction order (Step S112). The decided playback order is used for the content reproduction process (Step S3 in FIG. 3). For example, if the voting operation is not performed on a given piece of music data on the shared list S, the AV receiver 100 sets the score of the piece of music data as the score "0", which is the initial value thereof. Every time when the voting operation is performed on any one of the smartphones 301 to 303 with respect to the music data on the shared list S, the AV receiver 100 adds 1 point to the score of the piece of music data.

Figure 8A:
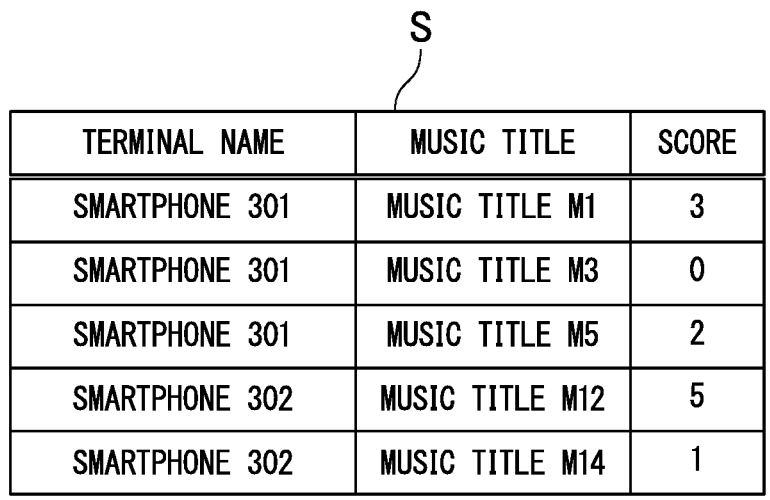
FIG. 8A is a diagram showing a shared list with score information added thereto, in the embodiment of the present invention.

FIG. 8A is a diagram showing the shared list S including score information (score) added to song data. In the shared list S shown in FIG. 8A, score "3" is associated with the music data whose title is the music title M1. That is to say, the shared list S shown in FIG. 8A indicates that the voting operation has been performed on the three smartphones with respect to the music data having the music title M1. FIG. 8A, for description, shows an example in which the voting operation has been performed on eleven smartphones.

The AV receiver 100 decides the order of music data having high scores, as the reproduction order of music data. That is to say, the AV receiver 100 decides the reproduction order of the music data included in the shared list S so that music data having a higher score (music data associated with a higher score) is reproduced earlier. The AV receiver 100 may decide the order of music data having low scores as the reproduction order of music data.

Each of the smartphones 301 to 303 is not limited to the mode in which it accepts only one voting operation (a voting operation for only one piece of music data). Each of the smartphones 301 to 303 may accept a plurality of voting operations. However, if the voting operation for each of the smartphones 301 to 303 is limited to one, the content reproduction system 900 can make the voting fair among all users.

The AV receiver 100 may receive voting information only within a predetermined period of time (for example, within one minute) after transmitting the shared list S (Step S23 in FIG. 4). In this case, the AV receiver 100 can start the content reproduction process (Step S3 in FIG. 3) even if no voting operation is performed on all of the smartphones 301 to 303. In the case of receiving the voting information only within the predetermined time, the AV receiver 100 can give each user of the smartphones 301 to 303 a way of enjoying selecting a piece of music data by performing the voting operation within the limited period of time. In this case, the smartphones 301 to 303 may display a countdown indicating the time limit. Alternatively, the AV receiver 100 may determine that the voting information received within a predetermined period of time from the moment of transmission of the shared list S is valid voting information, and may determine the voting information received after the predetermined period of time has passed as invalid voting information. In this case, the AV receiver 100 may decide the reproduction order of the music data based only on the valid voting information.

The AV receiver 100 may calculate the score and may determine the reproduction order after receiving the voting information from all of the smartphones 301 to 303. In this case, the content reproduction system 900 can give all users of the smartphones 301 to 303 a way of enjoying selecting music data together with other users.

After having finished calculating the score (Step S112), the AV receiver 100 transmits to the smartphones 301 to 303, a display change instruction (Step S113). The display change instruction is an instruction that causes the smartphones 301 to 303 to add a display of the score as the title 403 of each piece of music data in the shared list S being displayed. Specifically, the AV receiver 100 transmits to the smartphone 301 and the smartphone 302, the information of the score calculated in Step S112 and corresponding to each piece of music data in the shared list S. The display change instruction is also transmitted to smartphones that have not voted.

Upon receiving the display change instruction including the score information corresponding to each piece of music data in the shared list S (Steps S104 and S124), the smartphone 301 and the smartphone 302 display each music title 403 associated with the score (Steps S105 and S125). As a result, the users of the smartphone 301 to 303 can enjoy selecting music data while watching the voting status of other users.

Returning to FIG. 3, the content reproduction system 900 reproduces the plurality of pieces of music data in the reproduction order decided in Step S2 (Step S3). For example, the AV receiver 100 reproduces the plurality of pieces of music data in the decided reproduction order by creating a reproduction list R in which each piece of music data in the shared list S is sorted in the decided reproduction order.

Figure 8B:
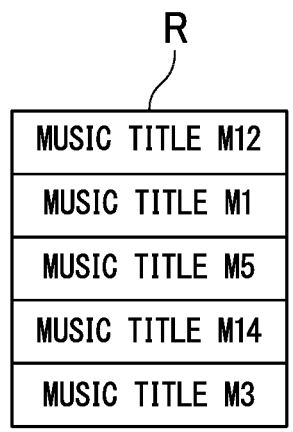
FIG. 8B is an example of a reproduction list in which music data of a shared list are arranged in descending order of scoring, in the embodiment of the present invention.

FIG. 8B is a list created by sorting the music data of the shared list S shown in FIG. 8A in a descending order of the score. As shown in FIG. 8B, the top of the reproduction list R indicates the music title M12 associated with the highest score of five points. The reproduction list R shown in FIG. 8B indicates, at the second from the top, the music title M1 associated with the second highest score of three points. That is to say, the reproduction list R shown in FIG. 8B is a list that ranks the shared list S in descending order of the score.

The AV receiver 100 decides that the music data at the top of the created reproduction list R is a reproduction target. The AV receiver 100 receives the music data from the smartphone that is capable of providing the music data among the smartphones 301 to 303. The smartphone that is capable of providing the music data of the reproduction target can be identified by making reference to the shared list S. While receiving the music data, the AV receiver 100 outputs from the loudspeaker 200L and the loudspeaker 200R, audio sound included in the music data.

When the reproduction of the reproduction target music data is completed, the AV receiver 100 deletes the music data at the top of the reproduction list R from the reproduction list R, and sets music data at the new top of the reproduction list R as a reproduction target. As described above, the AV receiver 100 performs reproduction of a plurality of pieces of music data according to the reproduction list R. However, the AV receiver 100 need not reproduce music data that has not been voted on (music data associated with 0 point).

As described above, the content reproduction system 900 is capable of reproducing the plurality of pieces of music data that can be provided by the smartphones 301 to 303 while providing each user of the smartphones 301 to 303 with a way of enjoying evaluating music data of other users and a way of enjoying selecting music data together with the other users.

In the above description, there has been described the case where the AV receiver 100 creates the shared list S in Step S1, decides the reproduction order in Step S2, and reproduces the music data in Step S3. However, the present embodiment is not limited to this example. For example, the smartphone 303 may create the shared list S in Step S1, decide the reproduction order in Step S2, and reproduce the music data in Step S3. That is to say, the processing performed by the AV receiver 100 in Steps S1 to S3 may be performed by the smartphone 303 instead of the AV receiver 100. In this case, the processing performed between the AV receiver 100 and the smartphone 303, for example, the transmission and reception processing of the public list, may be omitted because the transmission destination and the reception destination are the same and unnecessary. Alternatively, the smartphone 301 may create the shared list S in Step S1 and decide the reproduction order in Step S2, and the AV receiver 100 may reproduce the music data in Step S3. In this case, the processing performed by the AV receiver 100 in Steps S1 and S2 is performed by the smartphone 303 instead of the AV receiver 100. Also, after Step S2, the smartphone 303 transmits the decided reproduction order to the AV receiver 100. As a result, in Step S3, the AV receiver 100 can reproduce the plurality of pieces of music data in the decided reproduction order.

It is not indispensable for the present embodiment that the AV receiver 100 calculates the score. For example, the AV receiver 100 may decide the voting order of the voted music data as the reproduction order. That is to say, the AV receiver 100 may decide the reproduction order of the music data included in the shared list S so that music data indicated by the voting information received earlier is reproduced earlier.

When the content data includes video data, the AV receiver 100 may output the video data included in the content data, to a television set (not shown in the figure) via the HDMI 4 while receiving the content data from one of the smartphones 301 to 303.

Figure 9:
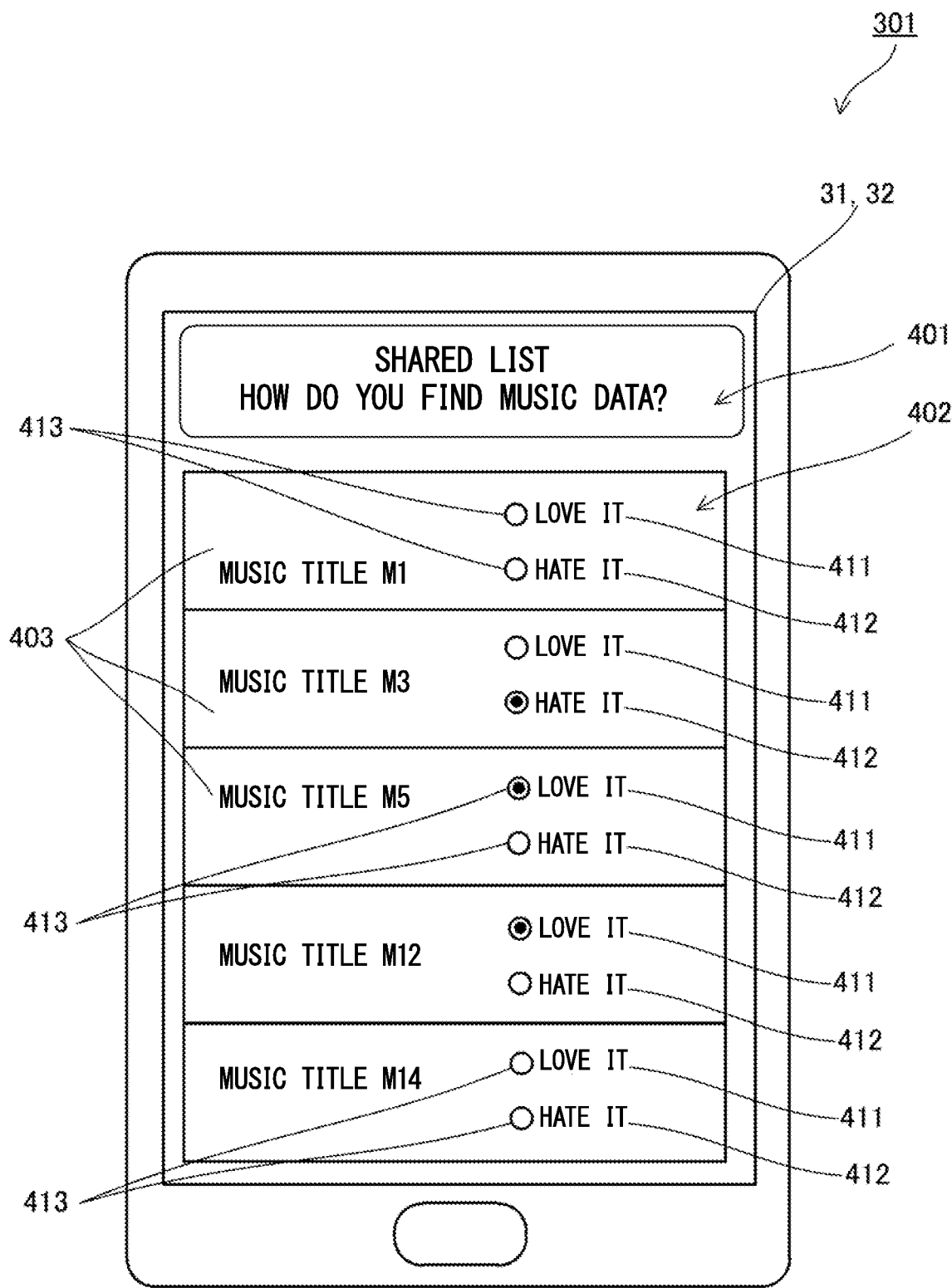
FIG. 9 is a diagram showing a display example of a smartphone for accepting an operation according to a first modified example of a voting operation, in the embodiment of the present invention.

FIG. 9 is a diagram showing a display example of the smartphone 301 accepting an operation according to a first modified example of the voting operation. FIG. 10 is a diagram showing an example of the shared list S with score information added thereto.

In the above example, the voting operation is an operation of selecting music data of the shared list S. On the other hand, the operation according to the first modified example shown in FIG. 9 is an operation of making selection indicating love (preference) or hate (that is, like or dislike) toward each piece of music data in the shared list S.

Specifically, as shown in FIG. 9, the smartphone 301 displays each music title 403 displayed in association with two radio buttons 413. The display of one of the two radio buttons 413 is associated with the display of a character string 411 indicating love. The display of the other one of the two radio buttons 413 is associated with the display of a character string 412 indicating hate.

The user selects one of the radio buttons 413 with respect to the music data indicated by the title 403 of each piece of music data, thereby performing a selecting operation to indicate love or hate. The smartphone 301 transmits information indicating the accepted selecting operation to the AV receiver 100.

As shown in FIG. 10, for example, the AV receiver 100 obtains the number of the selecting operations indicating love, the number of the selecting operations indicating hate, and the total score for the music data of the shared list S. In the example shown in FIG. 10, the total score is obtained by subtracting the number of selecting operations indicating hate from the number of the selecting operations indicating love. The total number of the selecting operations indicates the number of smartphones that accepted the operation. The AV receiver 100 reproduces several pieces of music data of the shared list S, in a reproduction order according to the total score. That is to say, the AV receiver 100 decides the reproduction order of the music data included in the shared list S so that music data having a higher total score (music data associated with a higher total score) is reproduced earlier. For example, the AV receiver 100 may reproduce only music data whose total score is greater than or equal to a predetermined score (for example, one point or higher). Here, FIG. 10 shows an example in which a voting operation is performed on 15 smartphones for the sake of description.

Each user of the smartphone 301 to 303 can select music data not to be reproduced by the AV receiver 100, by performing a selecting operation indicating hate. In addition, each user can prevent reproduction of music data that is desired to be reproduced by other users, or can reproduce music data that other users do not wish to reproduce. Therefore, selection of music data can be performed more enjoyably.

Figure 11:
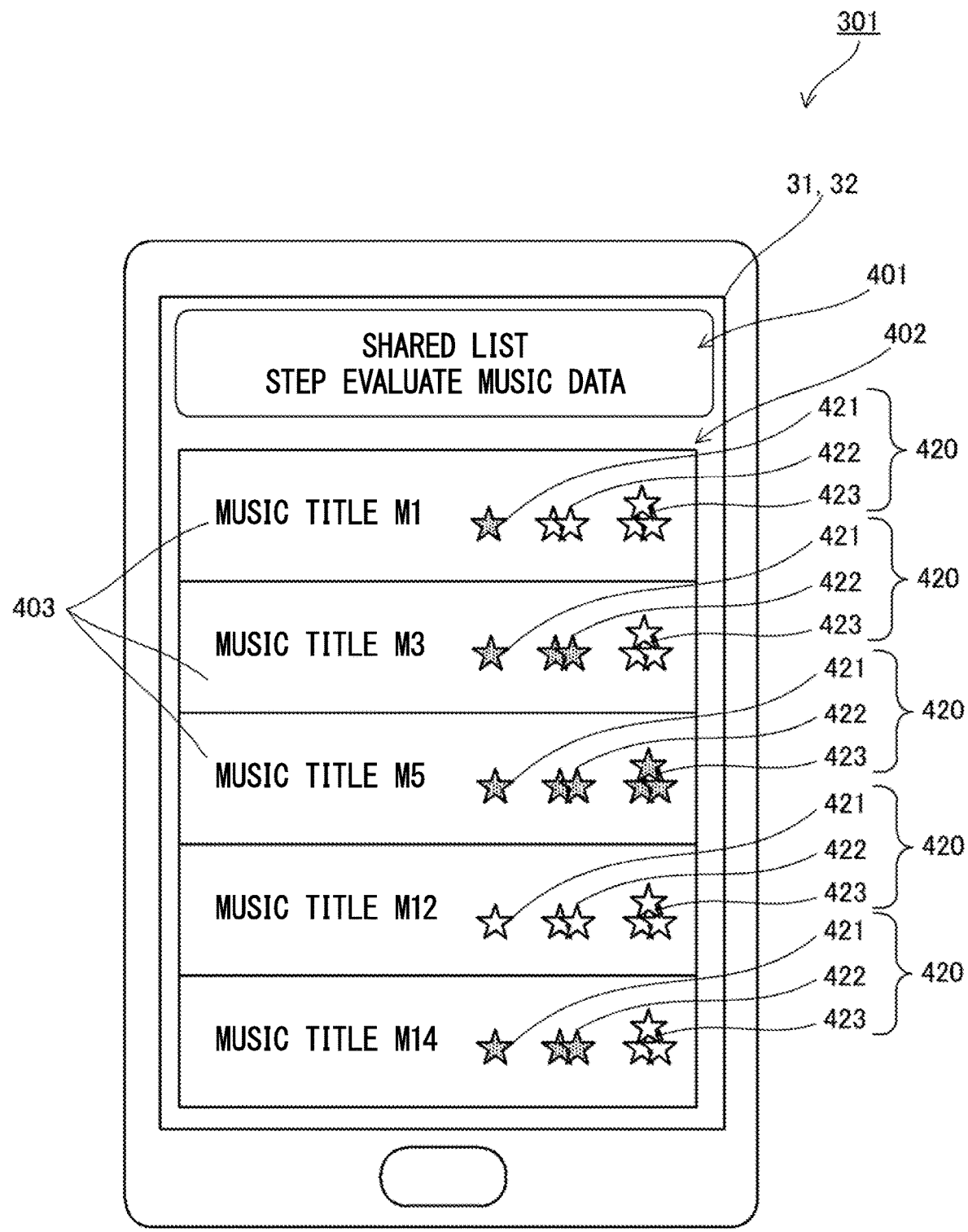
FIG. 11 is a diagram showing a display example of a smartphone for accepting a step evaluation operation according to a second modified example of the voting operation, in the embodiment of the present invention.

Next, FIG. 11 is a diagram showing a display example of the smartphone 301 accepting an operation according to a second modified example of the voting operation. The operation according to the second modified example is an operation of performing a step evaluation on each piece of music data in the shared list S. In the example shown in FIG. 11, the operation for performing the step evaluation is performed by selecting one of three evaluation steps.

Specifically, as shown in FIG. 11, the smartphone 301 displays in the display region 401, an instruction to evaluate each content on the shared list S. The smartphone 301 displays in the display region 402, the titles 403 of each piece of music data, and evaluation symbols 420 in association with each other. The evaluation symbol 420 includes a symbol 421, a symbol 422, and a symbol 423. The symbol 421 indicates the lowest evaluation out of the three steps of evaluation. The symbol 422 indicates the second lowest evaluation (that is, the second highest) out of the three steps of evaluation. The symbol 423 indicates the highest evaluation out of the three steps of evaluation.

The user of the smartphone 301 touches the display region of one of the symbols 421, 422, and 423 to thereby give one step evaluation on the corresponding music data. The smartphone 301 transmits to the AV receiver 100, step information that indicates the evaluation corresponding to each piece of music data.

The AV receiver 100 calculates the score for the music data as an average value of scores corresponding to the evaluation steps. For example, the AV receiver 100 sets the evaluation of the first step as one point, the evaluation of the second step as two points, and the evaluation of the third step as three points. The AV receiver 100 calculates the total score for the respective pieces of music data on the shared list S. Furthermore, the AV receiver 100 obtains an average value by dividing the calculated total score by the number of smartphones that accepted the evaluation operation. Therefore, the user can perform selection of music data more enjoyably while watching the average evaluation value.

Specific examples of the evaluation operation for the respective pieces of music data on the shared list S are not limited to the specific examples shown in FIG. 7, FIG. 9, and FIG. 11. The evaluation operation may be a comment input for music data. When the evaluation operation is a comment input, the AV receiver 100 reproduces several pieces of music data of the shared list S in the order of music data with a large number of comments, the order of music data with a large number of comment views, and other such orders. The content reproduction system 900 can provide a way to enjoy this type of music data selection even if the evaluation operation is the comment input.

Figure 12:
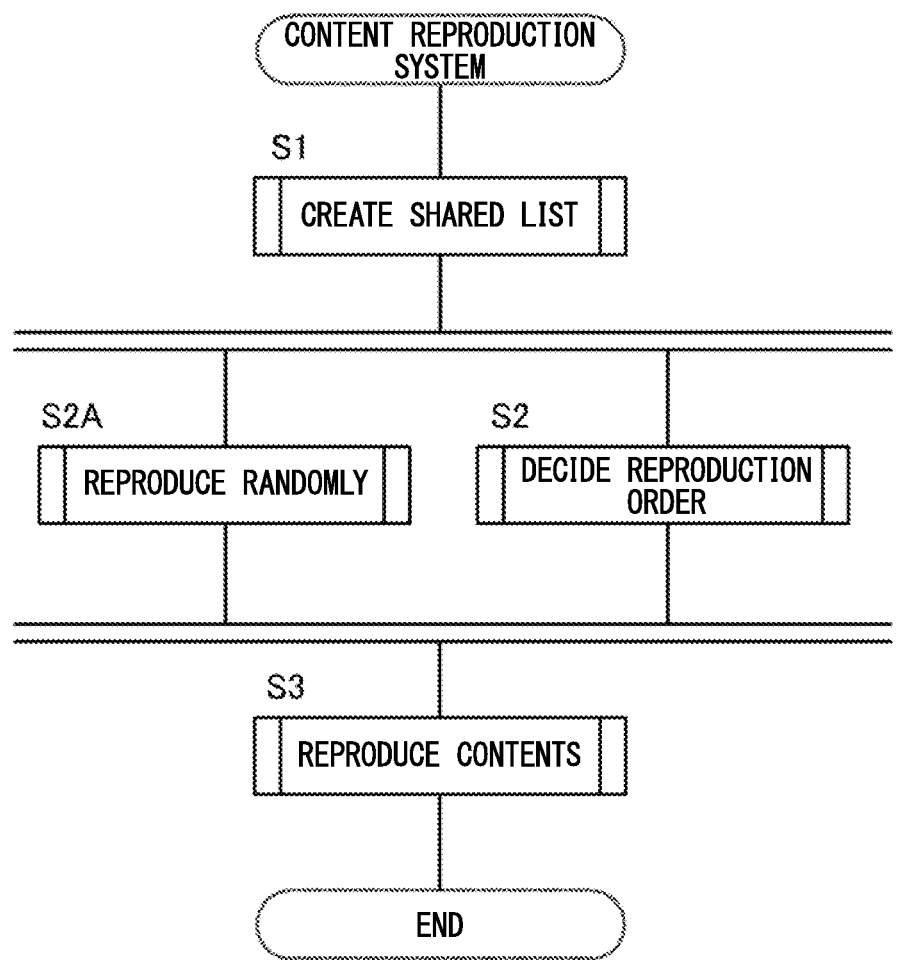
FIG. 12 is a flowchart showing operations of a content reproduction system according to a modified example, in the embodiment of the present invention.

Next, FIG. 12 is a flowchart showing an operation of the content reproduction system 900 according to a modified example. The flowchart shown in FIG. 12 differs from the flowchart shown in FIG. 3 in that the reproduction order decision processing and the random reproduction processing are executed in parallel.

As shown in FIG. 12, the content reproduction system 900 randomly reproduces music data of the shared list S in parallel with the reproduction order decision process (Step S2A). Specifically, the AV receiver 100 sequentially reproduces arbitrary music data from the music data of the shared list S in parallel with the reproduction order decision process (step S2). Upon completion of the reproduction order decision processing, the AV receiver 100 stops the random reproduction even while the music data is being randomly reproduced, and starts reproduction of the music data according to the decided reproduction order (Step S3).

In the modified example shown in FIG. 12, even in the case where the number of smartphones is large and completion of the voting operation on all the smartphones is time consuming, the user can perform random music data reproduction while selecting music data. The reproduction of music data in Step S2A is not limited to random reproduction. The reproduction of music data in Step S2A may be reproduction following along the arrangement order of music data in the shared list S.

The content reproduction system 900 may perform processing of updating the shared list S while performing the reproduction order decision process. That is to say, if any of the smartphones 301 to 303 updates the public list during random reproduction, the AV receiver 100 receives the updated public list and updates the shared list S based on the public list. Then, the AV receiver 100 transmits the shared list S to the smartphones 301 to 303 along with a display update instruction.

In the above example, the content reproduction apparatus has been described using the AV receiver that outputs sound signals to external loudspeakers. However, the present embodiment is not limited to this type of example. For example, the content reproduction apparatus may include loudspeakers. The content reproduction apparatus is not limited to an apparatus that is installed in a room, and may be a car audio apparatus that is installed within a vehicle for example. The content reproduction apparatus only needs to be an apparatus that enables listening and viewing of music contents and video contents, and for example, it may be a television set. In the above example there has been described the case where information that indicates contents is music titles (titles of music contents). However, the embodiment of the present invention is not limited to this type of example. Information that indicates contents may be artist names, album titles, music genres, and video content titles.

A content reproduction apparatus according to an embodiment of the present invention includes: a receiving unit that receives first information from a first user terminal that is capable of providing a first content, the first information comprising information that indicates the first content, the receiving unit receiving second information from a second user terminal that is different from the first user terminal and that is capable of providing a second content, the second information comprising information that indicates the second content; a control unit that creates a shared list comprising the first and second contents, based on the first and second information; and a transmission unit that transmits the shared list to the first user terminal. The receiving unit receives first evaluation information from the first user terminal, the first evaluation information indicating a first evaluation for at least one content comprised in the shared list. The control unit decides a reproduction order of contents comprised in the shared list, based on the received first evaluation information. For example, the control unit reproduces each content of the shared list in the order of contents with higher evaluation. As a result, the content reproduction apparatus reproduces several contents in the order of the contents that are preferred by many users. Therefore, each user together with other users can enjoy and select contents desired to be reproduced by the content reproduction apparatus.

The control unit may add to the shared list, information (score information) based on the evaluation information received by the receiving unit, and the transmission unit may transmit the shared list to the first user terminal, and each user terminal may display the shared list with added information based on the evaluation information.

As a result, the user can evaluate contents of other users and select contents together with other users with enjoyment while seeing evaluation of other users with respect to the contents of the shared list.

The control unit may decide the reproduction order of each content of the shared list after receiving the evaluation information from all of the user terminals.

With this configuration, the content reproduction apparatus can enable all users to evaluate before reproducing contents. That is to say, with this configuration, all users can select a content with enjoyment before reproducing the content.

The control unit may randomly reproduce each content of the shared list until the evaluation information from all of the user terminals have been received.

With this configuration, each user can enjoy random reproduction of contents while selecting contents.

The present invention may be applied to a content reproduction apparatus, a content reproduction system, and a content reproduction method.

What is claimed is:

1. A content reproduction apparatus comprising:
   a circuit that amplifies a sound signal to reproduce a content;
   a communication interface; and
   a processor configured to execute a plurality of tasks, including:
      a receiving task that that receives:
         first information, via the communication interface, from a first user terminal providing a first content, the first information-including information that indicates the first content; and
         second information, via the communication interface, from a second user terminal, which is different from the first user terminal, providing a second content, the second information including information that indicates the second content;
      a shared list creating task that creates a shared list comprising the first and second contents based on the first and second information;
      a transmitting task that transmits the shared list, via the communication interface, to at least the first user terminal,
      wherein the receiving task further receives first evaluation information, via the communication interface, from at least the first user terminal, the first evaluation information indicating a first evaluation for at least one content included in the shared list;
      a reproduction order deciding task that decides a reproduction order of contents included in the shared list based on the received first evaluation information; and
      a content reproducing task that reproduces the contents included in the shared list according to the reproduction order decided by the reproduction order deciding task.

2. The content reproduction apparatus according to claim 1, wherein:
   the first evaluation indicates that one of the first or second content is evaluated higher than the other of the first or second content, and
   the reproduction order deciding task decides the reproduction order based on level of evaluation indicated by the first evaluation information.

3. The content reproduction apparatus according to claim 1, wherein:
   the reproduction order deciding task adds information based on the first evaluation information to the shared list, and
   the transmitting task transmits, to the first user terminal, the shared list to which the information based on the first evaluation information is added.

4. The content reproduction apparatus according to claim 3, wherein the first evaluation information indicates a score of at least one content included in the shared list.

5. The content reproduction apparatus according to claim 1, wherein:
   the transmitting task further transmits the shared list, via the communication interface, to the second user terminal,
   the receiving task further receives second evaluation information, via the communication interface, from the second user terminal, the second evaluation information indicating a second evaluation for at least one content included in the shared list, and
   the reproduction order deciding task decides the reproduction order, based on the received first and second evaluation information.

6. The content reproduction apparatus according to claim 5, wherein the reproduction order deciding task decides the reproduction order after the receiving task has received the first evaluation information and the second evaluation information.

7. The content reproduction apparatus according to claim 5, wherein the content reproducing task further reproduces the contents included in the shared list before the receiving task has received the first evaluation information and second evaluation information.

8. The content reproduction apparatus according to claim 1, wherein the information indicating the first content comprises a title of the first content.

9. The content reproduction apparatus according to claim 1, wherein the transmitting task transmits the reproduction order, via the communication interface, to at least one of the first or second user terminal.

10. A content reproduction system comprising:
    a first user terminal providing a first content;
    a second user terminal providing a second content; and
    a content reproducing apparatus comprising:
       a circuit that amplifies a sound signal to reproduce a content;
       a communication interface; and
       a processor configured to execute a plurality of tasks, including:
          receiving task that receives:
             first information, via the communication interface, from the first user terminal, the first information including information that indicates the first content; and
             second information, via the communication interface, from the second user terminal, which is different from the first user terminal, the second information including information that indicates the second content;
          shared list creating task that creates a shared list comprising the first and second contents based on the first and second information;
          a transmitting task that transmits, via the communication interface, the shared list to at least the first user terminal,
          wherein the receiving task further receives first evaluation information, via the communication interface, from at least the first user terminal, the first evaluation information indicating a first evaluation for at least one content included in the shared list;

a reproduction order deciding task that decides a reproduction order of contents included in the shared list based on the received first evaluation information; and a content reproducing task that reproduces the contents included in the shared list according to the reproduction order decided by the reproduction order deciding task.

11. A content reproduction method for a content reproduction apparatus including a circuit that amplifies a sound signal to reproduce a content and a communication interlace, the method comprising:

receiving first information, via the communication interface, from a first user terminal providing a first content, the first information including information that indicates the first content;

receiving second information, via the communication interface, from a second user terminal, which is different from the first user terminal providing a second content, the second information including information that indicates the second content;

creating a shared list comprising the first and second contents based on the first and second information;

transmitting the shared list, via the communication interface, to at least the first user terminal;

receiving first evaluation information, via the communication interface, from at least the first user terminal, the first evaluation information indicating a first evaluation for at least one content included in the shared list;

deciding a reproduction order of contents included in the shared list based on the received first evaluation information; and reproducing the contents included in the shared list according to the decided reproduction order.

12. The content reproduction method according to claim 11, wherein:

the first evaluation indicates that one of the first or second content is evaluated higher than the other of the first or second content, and the deciding of the reproduction order decides the reproduction order based on level of evaluation indicated by the first evaluation information.

13. The content reproduction method according to claim 11, further comprising:

adding information based on the first evaluation information to the shared list, and transmitting the shared list to which the information based on the first evaluation information is added to the first user terminal via the communication interface.

14. The content reproduction method according to claim 13, wherein the first evaluation information indicates a score of at least one content included in the shared list.

15. The content reproduction method according to claim 11, further comprising:

transmitting the shared list, via the communication interface, to the second user terminal; and receiving second evaluation information, via the communication interface, from the second user terminal, the second evaluation information indicating a second evaluation for at least one content included in the shared list, wherein the deciding of the reproduction order decides the reproduction order based on the received first and second evaluation information.

16. The content reproduction method according to claim 15, wherein the deciding of the reproduction order decides the reproduction order after the first evaluation information and the second evaluation information have been received.

17. The content reproduction method according to claim 15, further comprising reproducing contents included in the shared list before the first evaluation information and second evaluation information have been received.

18. The content reproduction method according to claim 11, wherein the information indicating the first content comprises a title of the first content.

19. The content reproduction method according to claim 11, further comprising transmitting the reproduction order, via the communication interface, to at least one of the first or second user terminal.

* * * * *